May 21, 1940.  A. CURIONI  2,201,854
SELF-CONTAINED GAS GENERATING PLANT
Filed Dec. 24, 1937  3 Sheets-Sheet 1
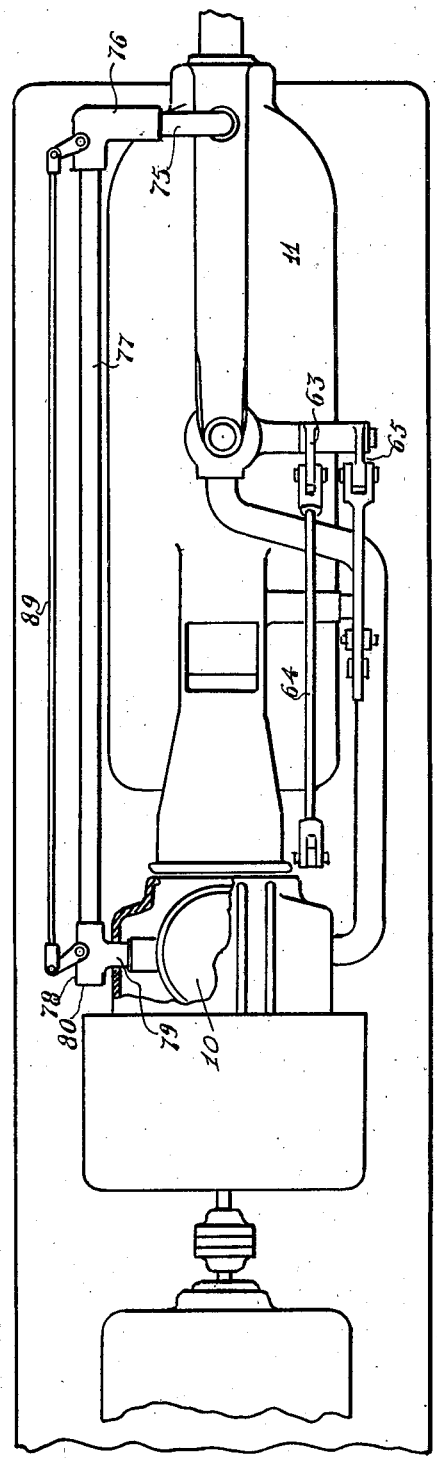
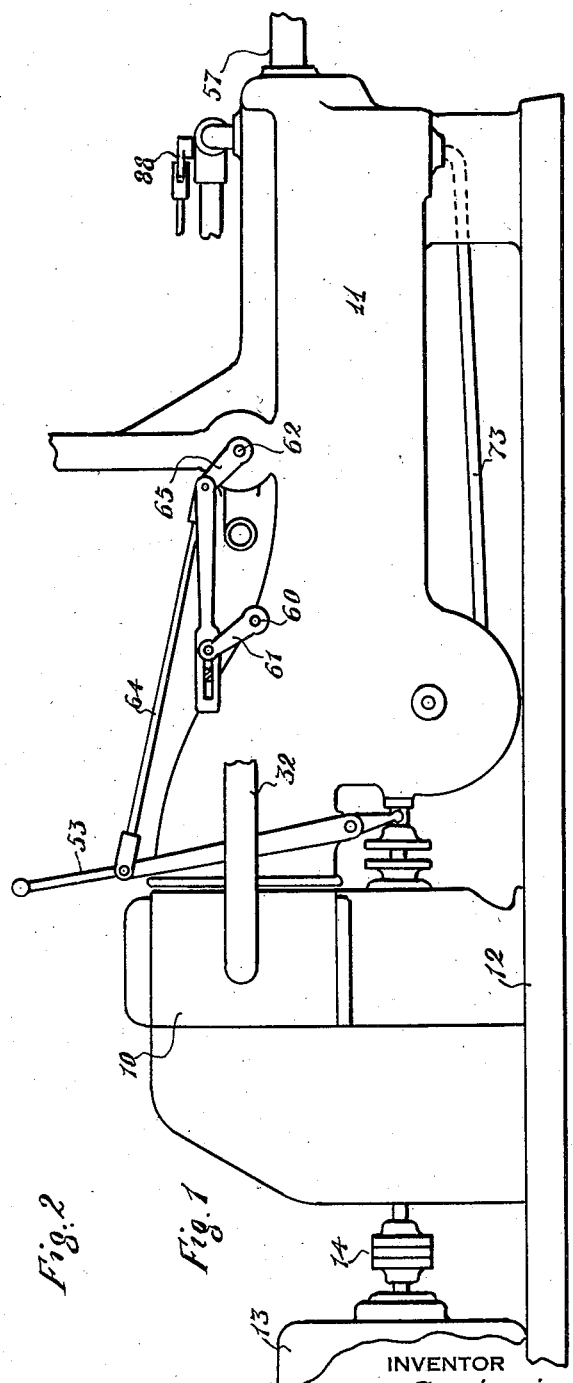
INVENTOR
Aldo Curioni
BY
ATTORNEY May 21, 1940.   A. CURIONI   2,201,854
SELF-CONTAINED GAS GENERATING PLANT
Filed Dec. 24, 1937   3 Sheets-Sheet 2
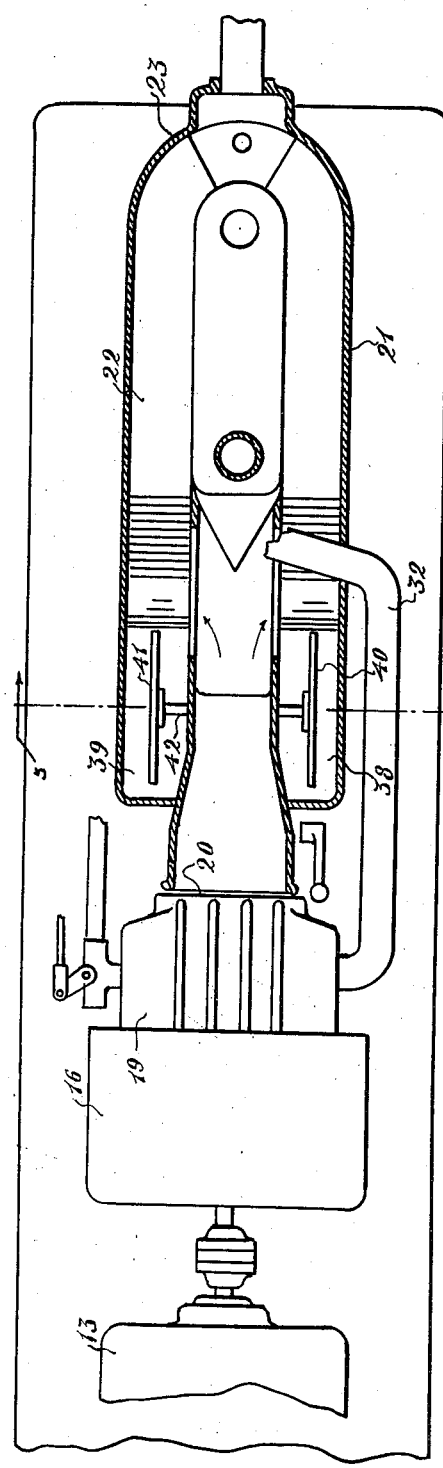
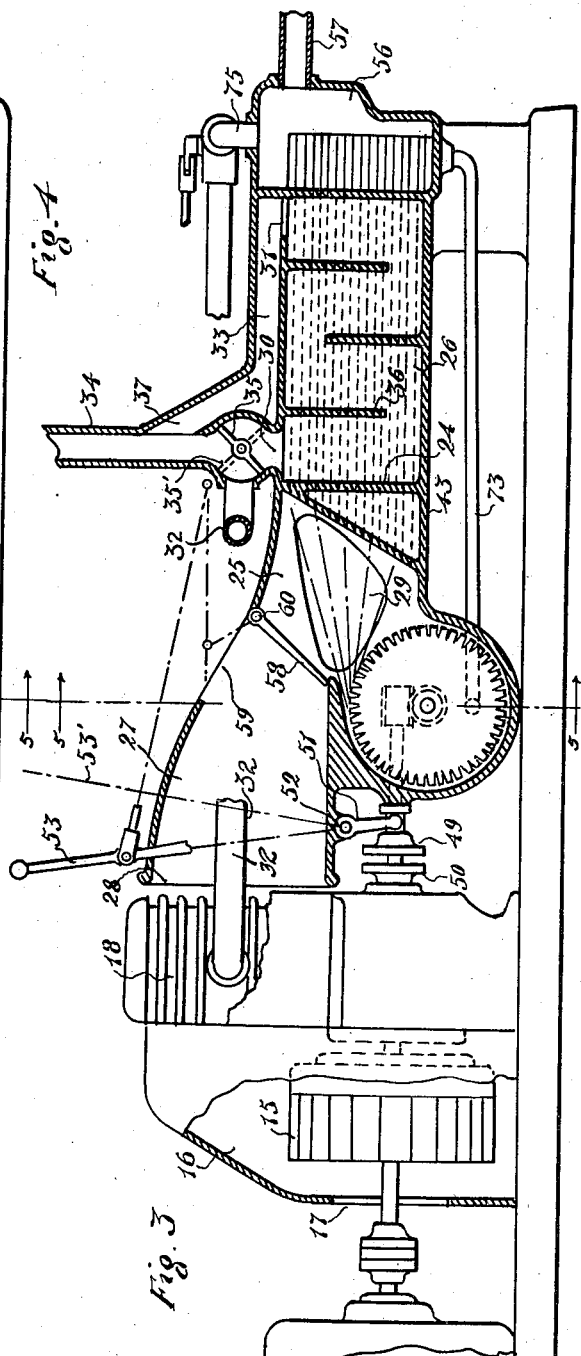
INVENTOR
Aldo Curioni
BY
ATTORNEY

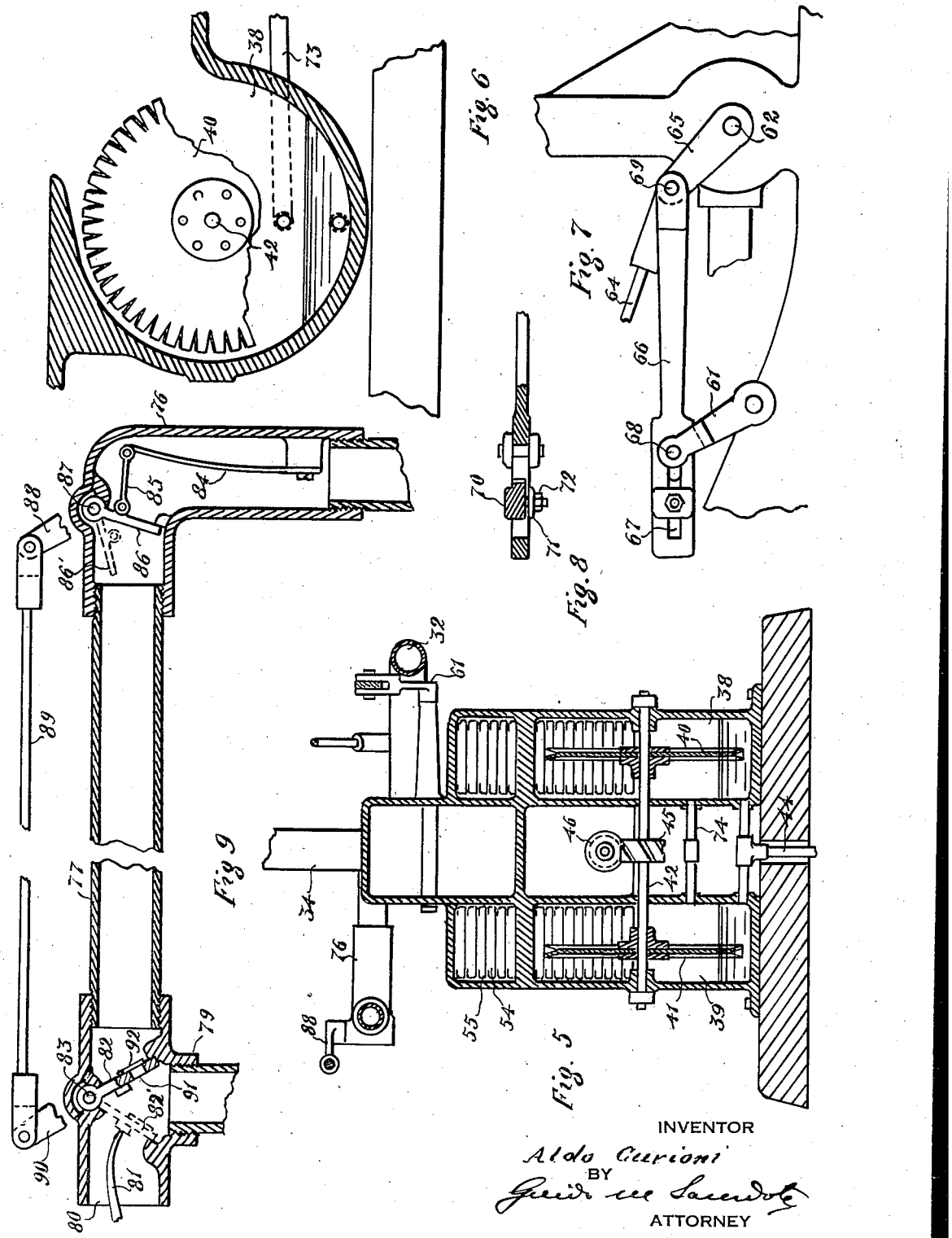

Patented May 21, 1940

2,201,854

UNITED STATES PATENT OFFICE 2,201,854

SELF-CONTAINED GAS GENERATING PLANT

Aldo Curioni, Katonah, N. Y., assignor to The Gasolaire Corporation, Mount Kisco, N. Y., a corporation of New York Application December 24, 1937, Serial No. 181,591

7 Claims. (Cl. 123—3)

This invention relates to gas and power generating plants and more particularly refers to improvements in devices, preferably in unitary form, making it possible to utilize power and heat generated by a heat engine for the operation of a gasifying apparatus adapted to produce gas for domestic and other purposes.

My invention is especially intended for use on farms and in isolated dwellings where for any reason it is found desirable to produce power for lighting or other purposes. Electric generating plants for isolated dwellings and the like are extensively used in localities where public electric service is not available or where high rates make it more economical to run a private plant. These small generating plants generally consist of a gasoline engine directly connected to a dynamo generating the current required for lighting and for running such electric motors as may be needed for domestic and other purposes.

In such instances where an electric generating plant of the character mentioned is required, a gas generating plant for cooking and other purposes is usually also needed, and separate installations are usually made in order to provide these facilities. Many of these installations are based upon the use of liquefied hydro-carbon gases which require frequent servicing and are expensive to run.

Where an individual electric generating plant is used it is, of course, possible to employ for the generation of gas a gasifying apparatus of the type described and claimed in my Patent No. 1,977,872, for "Gasifying apparatus," in which an electric motor is employed for running an atomizing device for the fuel and a fan for supplying air to the fuel mixture and electric heating elements are also used for providing heat assisting the vaporization of the fuel.

However, it is obviously desirable to combine the power and gas generating plants in a single unit, not only because a saving in space can thus be effected, but also because material savings can also be realized in the first cost and in the cost of installation as well as in the operating cost. I have found that a unitary device enabling the user to produce both power and gas can be made in such compact form that it is adaptable for use not only on farms and other dwellings, but also in boats, trailers and such other places where a very limited space is available.

In a broad sense, my invention consists in coupling together a heat engine capable of generating both power and heat and a vaporizing apparatus capable of generating gas by the vaporization of a volatile or vaporizable fuel.

The particular embodiment herein described includes the preferred form of heat engine that I intend to employ; namely, a gasoline or similar engine, although the expression "heat engine" implies that it is possible to employ a fuel oil, or even a steam engine instead whenever it should be desirable to do so.

The primary object of my invention accordingly is to provide a combination power and gas generating plant, in which the heat generated by the exhaust of the engine or by the cooling medium, or both, is utilized for assisting the vaporization of a volatile or vaporizable fuel, such as gasoline, and the power is utilized for actuating the fuel atomizing and air supplying devices required by the gas generating apparatus.

Another object is to provide a combination power and gas generating plant built in unitary form, in which a gasoline or similar engine is directly connected to and drives the moving parts of the gas generating apparatus and in which the heat generated by the engine is utilized in assisting the vaporization of the fuel.

A still further object is to provide a combination gas and power generating plant of unitary construction, in which a gasoline or similar engine is employed to drive the moving parts of the gas generating apparatus, and in which the cooling air displaced by the fan forming part of the engine's equipment is supplied to the gas generating apparatus for the purpose of forming an air-fuel mixture, so as to avoid the necessity of equipping the gas generating apparatus with a separate fan.

An additional object is to provide a combination explosion engine and gas generating apparatus, in which the power and heat generated by the engine are utilized for the operation of the gas generating apparatus and part of the gas generated by said apparatus is utilized to run the engine.

Other objects and advantages of the present invention will more fully appear as the description proceeds and will be set forth and claimed in the appended claims.

My invention is illustrated by way of example in the accompanying drawings, in which:

Fig. 1 is a side view in elevation of a power and gas generating plant of unitary construction embodying my invention;

Fig. 2 is a plan view thereof with parts broken away and sectioned;

Fig. 3 is a vertical longitudinal section of the same;

Fig. 4 is a plan view thereof with the gas generating apparatus shown in section;

Fig. 5 is a vertical section through line 5—5 of Fig. 3;

Fig. 6 is a fragmentary longitudinal section of one of the splash wheel housings, in an enlarged scale, showing the construction of the splash wheel;

Fig. 7 is a detail side view in elevation, in an enlarged scale, of the air valve control connections;

Fig. 8 is a fragmentary horizontal section thereof; and

Fig. 9 is a fragmentary horizontal section in an enlarged scale illustrating a thermostatically controlled system of valves for admitting air or gas to the engine intake port.

The generating plant illustrated comprises a gasoline engine 10 and a gas generating apparatus 11, mounted on a common base 12, the gasoline engine being of a type currently used in connection with small electric generating plants in which a dynamo 13 is directly connected to the engine by means of a coupling 14.

The unit engine-dynamo is generally used for producing electric current for light and other domestic purposes, so that the plant including also a gas generating apparatus constitutes a unit capable of generating both electric current for lighting and other purposes and gas for cooking and heating purposes.

The engine is of the air cooled type equipped with a fan 15, housed within an enclosure 16 having an air inlet 17, directing the air delivered by the fan against and around the cylinder 18. To this end the enclosure 16 is formed with an extension 19, constituting an enclosure for the cylinder, said enclosure being provided with an outlet 20.

The gas generating apparatus which, as stated, is shown of a type somewhat similar to that described and claimed in my patent above referred to, comprises an elongated casing 21, divided by suitable vertical partitions into several chambers. A C-shaped chamber 22 runs along the two sides of the casing and its front end 23.

The central portion of the casing is divided by a vertical partition 24 into an air supply chamber 25 and a heating chamber 26, said air supply chamber extending at the rear into a conduit 27, the open end 28 of which faces the outlet 20 of extension 19.

The sides of the air chamber are each provided with an opening 29 directing the air forced through said chamber by the fan 15 to the side compartments of the C-shaped chamber 22.

The heating chamber is provided with an inlet 30 and an outlet 31, said inlet being adapted to be connected to the exhaust conduit 32, and said outlet being connected by a passage 33 to the discharge pipe 34.

Said discharge pipe may be connected to the exhaust conduit 32 through the intermediary of the heating chamber, or else it can be connected to it in a direct manner according to the position of a butterfly valve 35, which can be set in the position shown in full lines in Fig. 3, or else can be set in the position shown in dotted lines at 35'. It will be seen that when said butterfly valve is in the position shown in full lines in said Fig. 3, the exhaust gases are discharged directly into discharge pipe 34, while if the butterfly valve is moved to the position shown in dotted lines at 35', said exhaust gases will enter the heating chamber and will follow therein a sinuous passage defined by a number of baffle plates 36 before reaching the outlet 31 and through conduit 33 and its extension 37, finally reaching the exhaust pipe 34.

The two side compartments of C-shaped chamber 22 extend at the rear to form each a fuel well 38, 39, in which rotate impeller wheels 40, 41, respectively, carried by a common transversal shaft 42.

The bottom of each well 38, 39, which is lower than the bottom 43 of the casing, contains a certain quantity of liquid fuel, just enough to submerge part of the lower peripheral portion of the impeller wheel. The fuel is normally supplied to said well from a supply tank through inlet pipe 44, the level of the liquid within said wells being automatically maintained in any suitable manner.

Shaft 42 carrying the impeller wheels may be driven by a set of helical gear wheels, one of which, 45, is mounted on said shaft and the other, 46, is mounted on the longitudinal shaft 47, coaxial with shaft 48 of the engine. Said shaft 47 may be connected to shaft 48 by means of a clutch 49—50, the movable member 49 of said clutch being controlled by an arm 51 carried by a transversal shaft 52, in its turn actuated by a hand lever 53.

The front portion of each side compartment of C-shaped chamber 22 constitutes a vaporizing chamber in which fuel is projected by the corresponding impeller wheel. Said vaporizing chambers are of cellular formation being constituted by a number of relatively shallow superimposed sections 54, formed by C-shaped channelled sheet metal members 55, the object of which is to provide a large distributing and evaporating surface for the fuel delivered to said vaporizing chambers by the impeller wheels 40, 41.

The cooling air delivered by the fan becomes heated by contact with the outer surface of cylinder 18 and passing through the sections 54 of the vaporizing chambers will assist the vaporization of the fuel, both on account of the velocity and temperature of said air. Furthermore, the vaporizing chambers are maintained at a relatively high temperature, favoring the complete vaporization of the fuel by the exhaust gases passing through the heating chamber when butterfly valve 35 is in the position shown at 35'.

The air-fuel mixture travelling from one end to the other of the vaporizing chambers reaches a front collecting chamber 56, and from there may be delivered to a system of burners or to a supply reservoir by a delivery pipe 57.

The two main elements constituting the unitary power and gas generating plant are preferably arranged so that the engine may be run independently of the gas generating apparatus, if desired. As stated, the mechanical connection between the engine shaft and the impeller wheels may be rendered operative or inoperative by clutch 49—50. When the moving parts of the gas generating apparatus are rendered inoperative by the clutch being set in the position shown in the drawings, it is desirable to provide a direct discharge of the cooling air and the exhaust gases so that the gas generating apparatus will entirely cease to function. I therefore, provide an air valve 58 controlling an opening 59 in the upper wall of conduit 27, causing the air delivered to said conduit to be discharged directly into the atmosphere when the valve 58 is in the position shown in Fig. 3. Said valve is pivotally mounted at 60 and is controlled by an arm 61 in a manner which will be presently explained.

The operation of lever 53 is utilized for actuating the air and exhaust valves simultaneously with the movable member 49 of the clutch. To this end, shaft 62, carrying the butterfly valve 35, is provided with an arm 63 directly connected to lever 53 by a connecting rod 64, so that when the lever 53 is moved to the position shown in dotted lines at 53', the butterfly valve will be moved to the position shown in dotted lines at 35'.

Another connection is established between another arm 63 mounted on shaft 62 and arm 61 controlling the air valve.

Said connection is preferably so arranged that the air valve may be angularly displaced to the full extent where it will entirely close opening 59 or only partially to a position where a greater or less proportion of the air delivered to conduit 27 will be allowed to escape directly into the atmosphere while the balance is caused to be discharged into the vaporizing chambers.

This is done in order to provide means for regulating the amount of air in the fuel-air mixture in order to produce a richer or leaner mixture, as may be desired.

The connection between arm 65 and arm 61 is illustrated in detail in Figs. 7 and 8, in which it is seen that said two arms are connected by a connection 66 having its outer end provided with a slot 67, through which passes the pin 68 of arm 61.

The distance between the inner end of slot 67 and pin 69 of arm 65 is such that when butterfly valve 35 is in the position shown in full lines in Fig. 3, where the exhaust gases are discharged directly into the atmosphere, arm 61 is held in the position where air valve 58 fully closes the passage leading from conduit 27 to the air supply chamber 25.

Slot 67 is provided with a block 70, which may be adjustably fixed along said slot by means of a clamping plate 71 and a clamping nut 72. Said block may be set so that its inner end abuts against pin 68 or arm 61 and in that case the moment arm 65 is moved to its other position its movement will be transmitted to arm 61, which will be angularly displaced to the full extent so as to entirely close air outlet 59.

The entire amount of air delivered to conduit 27 will in this case pass through the vaporising chambers. If the block 70 is set at a position such as shown in the drawings, where its inner end remains at a certain distance from pin 68, there will be a certain amount of lost motion before arm 61 is actually caused to follow the movement of arm 65, so that when arm 65 reaches its other extreme position the air valve will have been angularly displaced only to a position where air discharge outlet 59 will be partially open so that part of the air will be deflected by the air valve 58 through said discharge outlet and part will be allowed to reach the vaporizing chambers.

It is obvious that the proportion of the air discharged into the atmosphere and that directed to the vaporizing chambers will vary according to the angular position assumed by the air valve, which in its turn is dependent upon the position at which block 70 has been set along slot 67.

As explained in my patent above referred to such portion of the fuel as may remain unvaporized is collected at the bottom of chamber 56 and from there is delivered back to the wells 38, 39 by a longitudinal pipe 73 and a cross connection 74. Such heavier fractions of the fuel are, therefore, directly returned by the impeller wheels to the vaporizing chambers where they will be finally vaporized due to their preheated condition. The unvaporized portions of the fuel are thus prevented from gradually impoverishing the fuel supply and an efficient utilization of the fuel and a uniform composition of the gas produced are thus assured.

For the sake of efficiency I prefer to provide means whereby after the gas generating apparatus has become operative a portion of the gas produced may be directed to the intake of the engine and used to operate the engine in place of the fuel mixture supplied by the carburetor with which the engine is equipped. To this end, the collecting chamber 56 of the gas generating apparatus is provided with another outlet 75 leading through an elbow 76, and a pipe 77 to a T-fitting 78, the central leg, 79, of which is connected to the intake port of the engine.

The outer end 80 of said T-fitting constitutes the air intake within which is schematically shown the discharge nozzle 81 of the carburetor.

Said T-fitting is provided with a valve 82 pivotally mounted at 83, which can be angularly displaced from the position shown in full lines in Fig. 9, where it closes communication between pipe 77 and the central leg 79 of the T-fitting while establishing communication between the outer end 80 of said T-fitting and central leg 79, to the position shown in dotted lines at 82' where it closes the connection between outer end 80 of the T-fitting and central leg 79 and establishes a connection between said central leg 79 and pipe 77.

Valve 82 is thermostatically controlled so that while it occupies the position shown in full lines in the drawings when the engine is started or when the gas generating apparatus is inoperative, it will move to the position shown in dotted lines when the gas generating apparatus becomes operative.

Said valve 82 is preferably so arranged in relation to the carbureter nozzle that when said valve reaches its other position shown in dotted lines it will close the nozzle opening so as to positively prevent a possible waste of fuel.

The thermostatic control of said valve is provided by a thermostatic element 84 mounted within elbow 76. When no heated gases pass through said elbow the thermostatic element occupies the position shown in Fig. 9 where by means of a connecting link 85 it holds in a closed position a valve 86 mounted on a pivotal shaft 87. Said pivotal shaft 87 carries an arm 88 which is connected by a connecting rod 89 to another arm 90 carried by pivotal shaft 83 of valve 82.

The fuel-air mixture discharged into collecting chamber 56 from the vaporizing chambers is at a relatively high temperature and upon coming into contact with the thermostatic element 84 will cause said thermostatic element to be deflected from the position shown to a position where valve 86 will be moved to the position shown in dotted lines at 86'. This will cause a corresponding angular displacement of arm 88 which will be transmitted to arm 90 and valve 82 so that when valve 86 will come to occupy the position shown at 86', valve 82 will come to occupy the position shown at 82'. The suction of the piston within the cylinder will, therefore, be exerted upon the gas generated by the gas generating apparatus and the usual carbureter supply will be cut off.

When this scheme is adopted it is, of course, desirable to so arrange the gas generating apparatus that the gas generated thereby contains the proper amount of air for the complete combustion of the fuel. If, for any reason, it should be desirable to produce a richer air-fuel mixture a supplementary supply of air to the engine intake could be added, for instance, by providing valve 82 with an opening shown in dotted lines at 91, the area of said opening being adjustable by means of a shutter 92.

It is obvious that where the engine is provided with a water cooling system, the heated water can be circulated so as to transfer part of its heat to the air supplied to the vaporizing chambers, said air being preferably supplied in all cases by the fan with which the engine is usually provided in order to avoid the necessity of providing an extra fan in the gas generating apparatus.

It is also obvious that with suitable modifications the heat obtainable from the cooling system of the engine or that obtainable from the exhaust gases may be utilized for the vaporization of the fuel instead of both, as shown. Other modifications within the range of skill of an expert in the art can be introduced without departing from the inventive idea.

The drawings should, therefore, be understood as being intended for illustrative purposes only and not in a limiting sense. I accordingly reserve the right to carry my invention into practice in all those ways and manners which may enter, fairly, into the scope of the appended claims.

I claim:

1. A gas and power generating plant, comprising a fuel vaporizing apparatus and an internal combustion engine associated therewith, said apparatus having a vaporizing chamber, means for directing air to said chamber, and means for atomizing and directing liquid fuel to said chamber, a fan actuated by said engine supplying air to said air directing means, means for transferring to said vaporizing chamber heat generated by said engine, means for operatively connecting said atomizing means to or disconnecting it from said engine, and means for deflecting said air and heat directly into the atmosphere when said atomizing means is disconnected from said engine.

2. A gas and power generating plant, comprising a fuel vaporizing apparatus and an internal combustion engine associated therewith, said apparatus having a vaporizing chamber, means for directing air to said chamber, and means for atomizing and directing liquid fuel to said chamber, a fan actuated by said engine supplying air to said air directing means, means for transferring to said vaporizing chamber heat generated by said engine, means for operatively connecting said atomizing means to or disconnecting it from said engine, and means operatively associated with said connecting means deflecting said air and heat directly into the atmosphere when said atomizing means is disconnected from said engine.

3. A gas and power generating plant, comprising a fuel vaporizing apparatus and an internal combustion engine associated therewith, said apparatus having a vaporizing chamber, means for directing air to said chamber, and means for atomizing and directing liquid fuel to said chamber, a fan actuated by said engine supplying air to said air directing means, means for transferring to said vaporizing chamber heat generated by said engine, means for operatively connecting said atomizing means to or disconnecting it from said engine, means controlling said connecting means, and means operatively associated with said controlling means, deflecting said air and heat directly into the atmosphere when said atomizing means is disconnected from said engine.

4. A gas and power generating plant, comprising a fuel vaporizing apparatus and an internal combustion engine associated therewith, said apparatus having a vaporizing chamber, means for directing air to said chamber, means for atomizing and directing liquid fuel to said chamber, and a heating chamber in a heat exchange relation with said vaporizing chamber, a fan actuated by said engine supplying air to said air directing means, means for operatively connecting said atomizing means to or disconnecting it from said engine, means for discharging through said heating chamber the exhaust gases generated by said engine, means controlling said connecting means, an air valve, an exhaust valve, and means operatively associating said valves with said controlling means, causing said valves to deflect said air and exhaust gases directly into the atmosphere when said atomizing means is thereby disconnected from said engine.

5. A gas and power generating plant, comprising a fuel vaporizing apparatus and an air cooled internal combustion engine associated therewith, said apparatus having a vaporizing chamber, means for directing air to said chamber, a well containing liquid fuel in front of said chamber, an impeller wheel partly submerged in said fuel atomizing and directing liquid fuel to said chamber, and a heating chamber in a heat exchange relation with said vaporizing chamber, said engine having a cooling fan, means for supplying to said air directing means air displaced by said fan, means for operatively connecting said impeller wheel to or disconnecting it from said engine, means controlling said connecting means, an air valve, an exhaust valve, and means operatively associating said valves with said controlling means, causing said valves to deflect said air and exhaust gases directly into the atmosphere when said impeller wheel is thereby disconnected from said engine.

6. A gas generating plant comprising the combination of an air cooled internal combustion engine and a fuel vaporizing apparatus, said apparatus having a vaporizing chamber, an air inlet in said apparatus leading to said vaporizing chamber, means in said apparatus for impelling and diffusing liquid fuel into said vaporizing chamber, said engine having a cooling fan supplying air to said air inlet, means for operatively connecting the impelling means to the engine, and means for discharging the exhaust gases generated by said engine through a passage within said vaporizing chamber in order to assist the vaporization of the fuel.

7. A gas generating plant comprising the combination of an air cooled internal combustion engine and a fuel vaporizing apparatus, said apparatus having a vaporizing chamber, an air inlet in said apparatus leading to said vaporizing chamber, means in said apparatus for impelling and diffusing liquid fuel into said vaporizing chamber, said engine having a cooling fan supplying air to said inlet, means for operatively connecting the impelling means to the engine, means for discharging the exhaust gases generated by said engine through a passage within said vaporizing chamber in order to assist the vaporization of the fuel, and valve means associated with said discharge means controlling the flow of the exhaust gases towards their point of ultimate discharge.

ALDO CURIONI.